(12) United States Patent
Medzhlumyan

(10) Patent No.: US 11,108,311 B2
(45) Date of Patent: Aug. 31, 2021

(54) BRUSHLESS MOTOR-GENERATOR HAVING A SPHERICAL STATOR AND SPHERICAL WINDINGS WITH DISPLACED POLES

(71) Applicant: Ruben Medzhlumyan, Tver (RU)

(72) Inventor: Ruben Medzhlumyan, Tver (RU)

( * ) Notice: Subject to any disclaimer, the term of this patent is extended or adjusted under 35 U.S.C. 154(b) by 64 days.

(21) Appl. No.: 16/407,600

(22) Filed: May 9, 2019

(65) Prior Publication Data
US 2020/0328663 A1   Oct. 15, 2020

(30) Foreign Application Priority Data
Apr. 15, 2019 (RU) .......................... RU2019111207

(51) Int. Cl.
| | | |
|---|---|---|
| *H02K 21/10* | (2006.01) | |
| *H02K 21/32* | (2006.01) | |
| *H02K 21/22* | (2006.01) | |
| *H02K 1/18* | (2006.01) | |
| *H02K 21/36* | (2006.01) | |
| *H02K 23/28* | (2006.01) | |

(Continued)

(52) U.S. Cl.
CPC ............. *H02K 21/10* (2013.01); *H02K 21/22* (2013.01); *H02K 21/32* (2013.01); *H02K 1/06* (2013.01); *H02K 1/14* (2013.01); *H02K 1/18* (2013.01); *H02K 16/04* (2013.01); *H02K 21/36* (2013.01); *H02K 23/02* (2013.01); *H02K 23/26* (2013.01); *H02K 23/28* (2013.01); *H02K 23/40* (2013.01); *H02K 23/405* (2013.01)

(58) Field of Classification Search
CPC .. H02K 1/06; H02K 1/14; H02K 1/18; H02K 16/04; H02K 21/10; H02K 21/22; H02K 21/32; H02K 21/36; H02K 23/02; H02K 23/26; H02K 23/28; H02K 23/40; H02K 23/405

USPC ............................. 310/49.34, 198, 208, 269
See application file for complete search history.

(56) References Cited

U.S. PATENT DOCUMENTS

| | | | | | |
|---|---|---|---|---|---|
| 3,044,309 | A | * | 7/1962 | Buchhold | G01C 19/58 74/5.46 |
| 3,178,600 | A | * | 4/1965 | Bers | G06G 7/22 310/166 |

(Continued)

FOREIGN PATENT DOCUMENTS

| | | |
|---|---|---|
| RU | 2316881 C2 | 10/2008 |
| RU | 2510559 C2 | 3/2014 |
| RU | 2545525 C1 | 3/2014 |

*Primary Examiner* — Tulsidas C Patel
*Assistant Examiner* — Rashad H Johnson
(74) *Attorney, Agent, or Firm* — Nadya Reingand; Yan Hunkin

(57) ABSTRACT

The invention relates to electrical engineering, in particular to electromagnetic devices. Brushless motor generator is disclosed, which includes a rotor with a permanent magnet and a stator, the windings of which have a rounded cross-section. According to the invention, the rotor is made in the form of a shaft with a permanent magnet fixed on it. The magnetic field vector of the poles of the magnet is perpendicular to the axis of rotation of the shaft. The stator is spherical, covering the magnet, and the axis of symmetry of the stator coincides with the axis of rotation of the shaft. From 1 to 12 windings are wound on the outer spherical surface of the stator; the windings forming the coils with uniformly offset poles relative to each other.

13 Claims, 3 Drawing Sheets

(51) Int. Cl.
*H02K 23/40* (2006.01)
*H02K 16/04* (2006.01)
*H02K 23/26* (2006.01)
*H02K 1/06* (2006.01)
*H02K 23/02* (2006.01)
*H02K 1/14* (2006.01)

(56) References Cited

U.S. PATENT DOCUMENTS

| | | | | |
|---|---|---|---|---|
| 4,100,444 | A * | 7/1978 | Boyd, Jr. | H02K 3/28 310/184 |
| 5,204,570 | A * | 4/1993 | Gerfast | H02K 1/2726 310/156.38 |
| 9,742,255 | B2 * | 8/2017 | Immonen | H02K 35/02 |
| 2004/0124729 | A1 * | 7/2004 | Long | H02K 1/02 310/156.38 |
| 2011/0273052 | A1 * | 11/2011 | Long | H02K 16/02 310/208 |
| 2012/0133234 | A1 * | 5/2012 | Da Costa Balas Ferreira | H02K 21/26 310/179 |
| 2013/0154423 | A1 * | 6/2013 | Hench | H02K 1/2793 310/114 |
| 2015/0048696 | A1 * | 2/2015 | Kobler | H02K 21/24 310/44 |
| 2016/0111927 | A1 * | 4/2016 | Jung | H02K 1/28 310/156.14 |
| 2017/0040861 | A1 * | 2/2017 | Ho | H02K 15/08 |
| 2018/0170581 | A1 * | 6/2018 | Zhang | B64G 1/283 |

* cited by examiner

BRUSHLESS MOTOR-GENERATOR HAVING A SPHERICAL STATOR AND SPHERICAL WINDINGS WITH DISPLACED POLES

CROSS-REFERENCE TO RELATED APPLICATIONS

The present patent application claims priority to Russian patent application RU2019111207 filed Apr. 15, 2019.

FIELD OF INVENTION

The invention relates to electrical engineering, in particular to electromagnetic devices, and is intended to convert electrical energy into mechanical energy of rotation due to a magnetic field and vice versa, mechanical energy of rotation into electrical energy.

The claimed technical solution can be used in aviation and automotive industry, drives of various devices and mechanisms for industrial and domestic purposes, it can also be used as a motor-generator in cars, electric bicycles, electric motorcycles, quadrocopters, helicopters, jet skis, industrial and household appliances.

BACKGROUND

Electric motor with permanent magnets, which is disclosed in RU 2316881, IPC H02K 23/28, H02K 23/04, application No. 2005131321/09, Oct. 2, 2008, contains a stator, being made as multi-pole stator with permanent magnets, as well as a rotor with an open or closed winding, having connection to the collector and brushes. The collector consists of two systems of contacts on a non-conductive base, isolated from each other and nested into each other so that when the rotor turns from one contact to another contact of the collector, the direction of the current in the rotor winding is reversed using two brushes that can touch any pair of collector contacts of two systems mentioned above. The beginning of the rotor winding is connected to one collector contact system, the end of the rotor winding is connected to another collector contact system, and between each pair of contacts of the mentioned systems there is a "spurious" contact that is not connected to the rotor winding to prevent two brushes of different polarity from touching by one brush; and the stator does not require energy.

The disadvantage of this technical solution is its short life span and weakened rotation due to the increased wear of the brushes due to their friction.

A modular electromagnetic device, which is disclosed in RU 2510559, IPC H02K1/18, H02K1/14, H02K7/18, H02K16/04, application No. 201034925/07, Mar. 27, 2014 has a stator and a rotor rotating between the surfaces of the stator and bearing a multitude of magnets distributed with alternating orientations in a ring-shaped structure. The stator contains at least one pair of magnetic yokes located symmetrically on both sides of the rotor. Each yoke has a pair of protruding arms, which extend to the magnets and carry a corresponding coil for receiving electrical energy from the electromagnetic device or feeding it into it. Each yoke is individually mounted on its own support, equipped with regulating blocks, which are made with the possibility of adjusting the position of the yoke relative to the opposite magnets. The yoke forms (together with the coils, the support, the regulating blocks, the measuring and control means controlling the yoke) the unit cell of the stator, which can be repeated many times to form single-phase or multi-phase modules.

The complexity of the design, the attraction of the magnets to the cores of the magnetic coils, the difficulty of adjusting the correct regulation of the magnetic yokes, the large mass and overall characteristics are disadvantages of this design.

As a prototype for our brushless motor generator we chose RU 2545525, IPC H02K 21/22, H02K 21/32, H02K 21/36, application No. 2013146274/07, Apr. 4, 2015, containing a rotating anchor, which is a rotor, located around the stationary stator. A group of permanent toroidal magnets symmetrically distributed on a circle is used as a rotating rotor, the magnetic poles of these magnets are located on their flat end surfaces and form an intermittent unidirectional magnetic flux along this circle. As a stationary stator, a winding is used, made on a circular frame of circular cross section, the axis of symmetry of which coincides with the axis of symmetry of the rotating armature.

The disadvantage of this device is its low reliability due to the fact that the gluing of toroidal magnets reduces their strength and at certain turns of the armature (rotor) can cause their destruction. In addition, the large diameter of the stator in combination with the small size of the magnets, creates a weak magnetic field of the armature, affecting the strength of the torque.

Trends in recent years show interest in brushless DC motors (generators) to ensure more reliable, efficient and less noisy operation. They are characterized by a smaller mass compared to collector engines of the same power. In DC collector motors, brushes wear out over time and can cause sparks. Therefore, the collector engine should not be used for work that requires long service life and reliability.

SUMMARY

The goal of this invention is the development of a brushless motor generator with a reduced weight and size of the stator and rotor, while preserving the characteristic force of the torque.

The technical result, that is achieved when using this invention, is due to the design of the stator and rotor, allowing increased reliability of the motor generator and reducing the weight and dimensions.

This technical result is achieved by the fact that the brushless motor generator, including a rotor with a permanent magnet and a stator, wherein the stator, covering the magnet, is made of a shape with rotational symmetry—sphere, ellipsoid, etc. Preferably, the windings are made of a rounded cross section. Preferably, the stator has a spherical shape. On the outer surface of the stator there are windings in the form of layers isolated from each other, forming from 1 to 12 stator coils with uniformly offset poles relative to each other. The rotor is made in the form of a shaft with a permanent magnet fixed on it, the magnetic field vector of the magnet poles is oriented perpendicular to the axis of rotation of the shaft, while the axis of symmetry of the stator coincides with the axis of rotation of the shaft.

The rotor shaft may have a cylindrical shape, for example, in the form of a rod, and is made of a magnetic material, as well as of a dielectric material.

The stator can be made of non-magnetic material, and its winding can be made of flat wire in the form of a tape, covered with insulation.

Performing the rotor in the form of a shaft with a permanent magnet oriented with respect to the shaft so that the magnetic field vector of the magnet poles is perpendicular to the shaft axis with a magnet fixed to it, provides, in addition to reducing the overall dimensions compared to the prototype, the placement of a permanent magnet inside the magnetic fields of the coil, which is necessary for their more effective interaction with the entire magnetic field of the permanent magnet, which increases the interaction force and, accordingly, provides greater reliability through smoother rotation of the rotor.

Placing the permanent magnet inside the spherical stator, on the outer surface of which spherical coils with uniformly displaced poles are wound, which means that the poles of the permanent magnet will be located directly inside the coil, also affects the reduction in weight and size characteristics with the same power and torque technical result. With the claimed construction of the motor generator, the permanent magnet is under the influence of a larger magnetic field, thus providing a smoother rotation of the rotor, which is evident at high revolutions.

Such a set of advantages distinguishes the claimed solution from the known analogues, and also distinguishes it from the well-known approach, having a permanent magnet directly inside the stator coils.

The location on the outer surface of the stator winding in the form of isolated from each other layers, forming from 1 to 12 stator coils with uniformly shifted poles relative to each other, allows you to create a uniform effect of the magnetic fields of the coils on the permanent magnet, ensuring uniform rotation of the rotor. The number of coils is selected based on the overall dimensions of the generator motor: for a small generator motor the number of coils is minimal, while the permanent magnet is in the magnetic field generated by the coil without losing the technical result. The minimum number of coils is one. At the same time, an increase in the number of coils above 12 is impractical, since this will increase the weight and size characteristics of the device without significantly increasing the torque force. Such a set of advantages distinguishes the claimed solution from known analogs, and also differs from the well-known approach, having a permanent magnet directly inside the stator coils.

BRIEF DESCRIPTION OF THE DRAWINGS

The claimed invention is illustrated by drawings, where:

Figure 1:
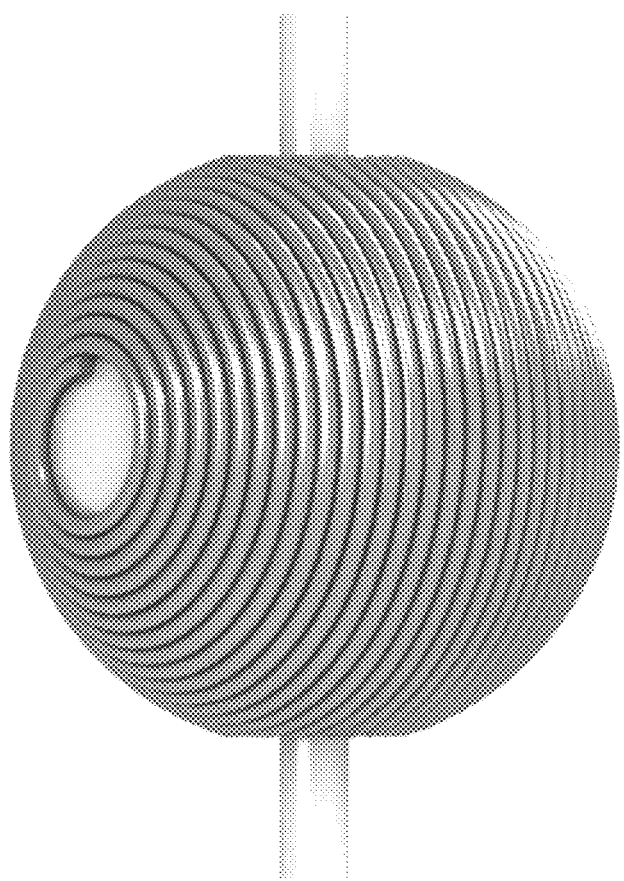
FIG. 1 shows a schematic general view of a brushless motor generator with a permanent magnet located inside the stator coil.
Figure 2:
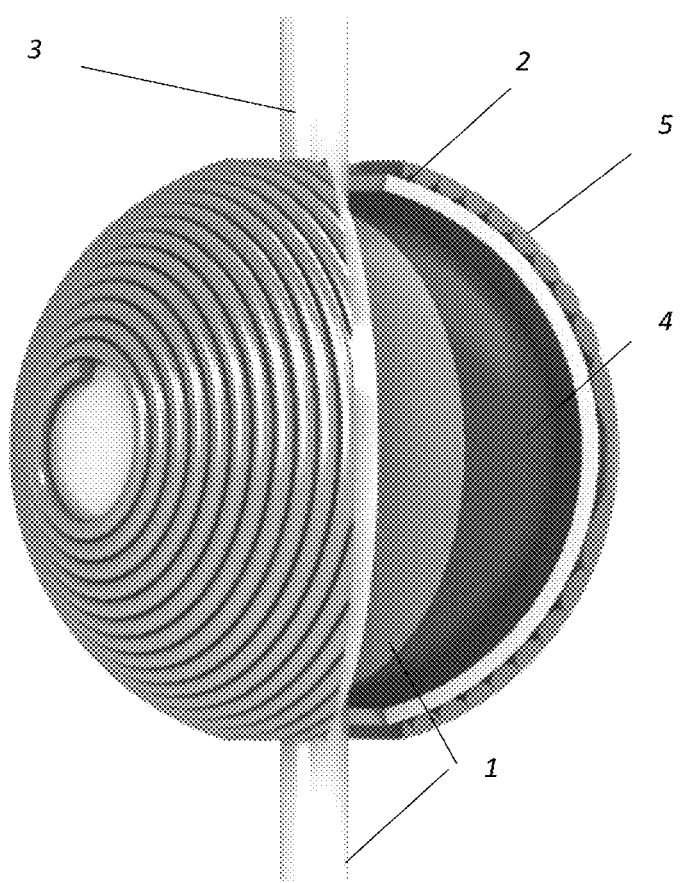
FIG. 2 shows the device with one coil in section.
Figure 3:
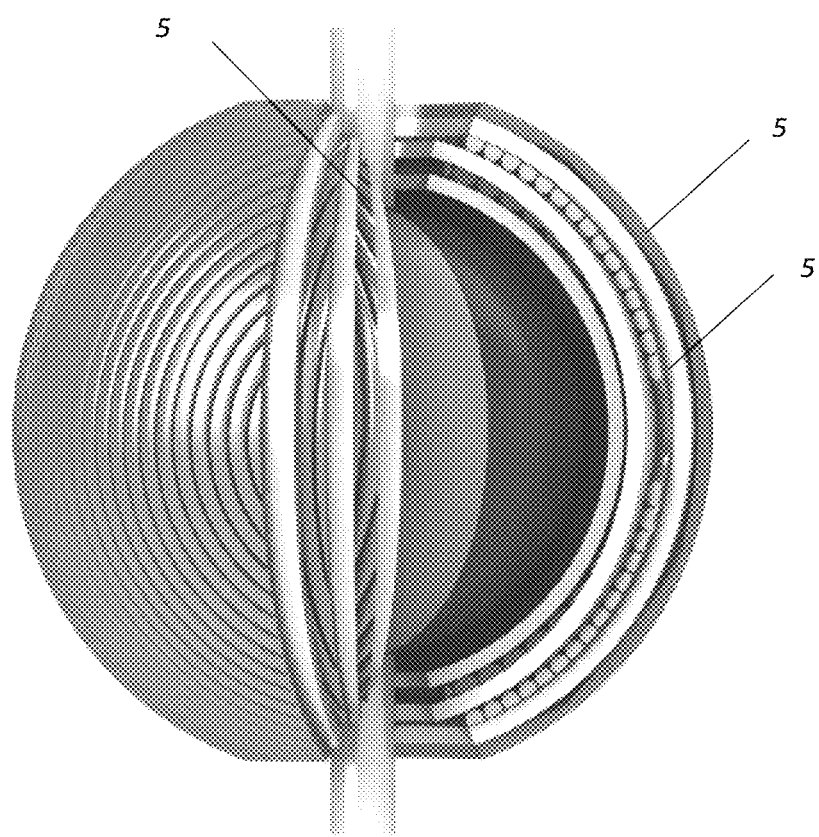
FIG. 3 shows the device with several coils in section. In principle, the motor generator can operate with a single coil, however introduction of more coils, up to 12 makes its operation smoother and more efficient.

The brushless motor generator includes a rotor 1 and a stator 2. The rotor 1 is made in the form of a shaft 3, on which a permanent magnet 4 is rigidly fixed. The rotor 1 is mounted for rotation inside the stator 2, so that the axis of rotation of the shaft 3 coincides with the axis of symmetry of the stator 2. At the same time, the magnetic field vector of the poles of the magnet 4 is perpendicular to the axis of rotation of the shaft 3. The stator 2 is stationary and has a rotational axis, for example, a sphere or an ellipse or other shape with rotational symmetry. The winding 5 is made on the outer surface of the stator 2. The winding 5 forms the coils of the stator 2. It is possible to position at least one coil of the stator 2 up to twelve coils. Obviously, these number of coils seems to be optimal, however, the larger number of coils is possible. The windings 5 are wound in layers, independently of each other, and are located along the surface of a spherical stator 2 with uniformly offset poles relative to each other. For example, in the case of two windings, two electromagnetic coils are formed, which have four poles. With so many coils should be placed on the surface of the stator 2 with the poles shifted relative to each other by 90°, and when performing three isolated windings, the poles are shifted by 60°. The stator 2 covers the magnet 4 so that it is completely located inside the stationary stator 2 and is inside the coils and the magnetic field of the coils. The shaft 3 is made of a cylindrical shape, such as a rod, pin, etc., and can be made of a non-magnetic or magnetic material. The stator 2 is made of a dielectric or composite magnetic material. The winding 5 of the stator 2 is made of insulated wire of circular cross section or insulated flat wire in the form of a tape.

DETAILED DESCRIPTION OF THE PREFERRED EMBODIMENT

The brushless motor generator operates as follows. The stator 2 and the rotor 1 are fastened in accordance with the planned application, for example, using bearings (not shown in the Figures), and the shaft 3 of the rotor 1 is placed in the inner ring of the bearing, while the stator 2 is placed on the outer ring of the bearing. When voltage is applied to the winding 5, it is powered, and the stator coil 2 is transformed into an electromagnet having two poles. The rotation of the rotor 1 is due to the interaction of the opposite poles of the magnetic fields between the permanent magnet 4 and the resulting electromagnet (coil under voltage). When the rotor 1 rotates and approaches the pole of the next coil, the voltage is applied to it, the next coil is also powered and becomes an electromagnet. Further process repeats for all coils. After that, the first coil is energized with reverse polarity. The process repeats, and the rotor 1 continues to rotate. Due to the fact that a permanent magnet 4 is located inside the stator 2, there is a strong magnetic interaction between the permanent magnet 4 and the resulting electromagnet, the poles of which are evenly displaced relative to each other along the surface of the stator 2, thereby achieving torque stability without jerking at any rotor speed that ensures the reliability of the device with its small weight and size parameters. The magnetic field of an electromagnet more effectively interacts with a permanent magnet, ensuring smooth rotor rotation with interacting magnetic fields, which is important at any rotor speed.

In the case of mechanical rotation of the shaft 3 from the outside, for example, by a windmill, by water flow, by car wheels, by rolling or by any other device and method, this motor goes into generator mode and provides electrical power that can be accumulated or consumed by external sources.

The invention is not limited to the description and examples presented and can be expanded within the scope of the claims, for example, a permanent magnet can be rigidly mounted on the rotor shaft, as well as be made monolithically with the shaft.

Brushless motors are much smaller than collector motors of the same power. The claimed invention has shown its effectiveness in achieving a technical result in its practical realization. At the same time, overall dimensions and weight of the claimed device are smaller compared with the known brushless generators, with the overall simplicity of performance and ease of operation and use in order to achieve the goal.

What is claimed is:

1. A brushless motor, including:
   a rotor with a permanent magnet, the permanent magnet being rigidly fixed to a shaft of the rotor,
   a stator, the stator having a rotational symmetry and covering the permanent magnet, and
   one or more windings, each winding being wound about an outer surface of the stator to form a concentric sphere surrounding the stator;
   wherein poles of the permanent magnet are oriented such that a magnetic field vector of the poles is non-parallel to an axis of rotation of the shaft, while an axis of the rotational symmetry of the stator coincides with the axis of rotation of the shaft,
   wherein any consecutive winding of the one or more windings forms a new concentric sphere having a radius greater than a radius of earlier concentric spheres formed by an earlier one of the one or more windings.

2. The brushless motor according to claim 1, wherein the shaft is cylindrical.

3. The brushless motor according to claim 1, wherein the shaft is made of a magnetic material.

4. The brushless motor according to claim 1, wherein the stator is made of a dielectric non-magnetic material.

5. The brushless motor according to claim 1, wherein the stator is made of a composite magnetic material.

6. The brushless motor according to claim 1, wherein the winding on an outer surface of the stator is a winding in a form of insulated layers, forming from 2 up to 12 stator coils with evenly shifted poles relative to each other.

7. The brushless motor according to claim 6, comprising two windings, each of the two windings having magnetic poles shifted by 90 degrees relative to one another.

8. The brushless motor according to claim 6, comprising three windings, each of the three windings having magnetic poles shifted by 60 degrees relative to one another.

9. The brushless motor according to claim 1, wherein the stator is spherical.

10. The brushless motor according to claim 1, wherein each of the one or more windings has a rounded cross section.

11. The brushless motor according to claim 1, wherein each of the one or more windings comprises a flat wire.

12. The brushless motor according to claim 1, wherein each of the one or more windings comprises a single continuous coil.

13. The brushless motor according to claim 12, wherein each single continuous coil forms a spherical spiral around the stator.

* * * * *